United States Patent [19]

Wadsworth

[11] 3,964,749

[45] June 22, 1976

[54] PENTOMINO PUZZLES

[76] Inventor: William Kent Wadsworth, 876 E. 900 North No. 15, Provo, Utah 84601

[22] Filed: Apr. 10, 1970

[21] Appl. No.: 27,312

[52] U.S. Cl............................................. 273/157 R
[51] Int. Cl.² ........................................... A63F 9/10
[58] Field of Search............. 273/156, 157 R, 136 G

[56] References Cited
UNITED STATES PATENTS

| | | | |
|---|---|---|---|
| 1,290,761 | 1/1919 | Lester............................. | 273/157 R |
| 2,235,615 | 3/1941 | Huffaker........................ | 273/136 G |
| 2,825,568 | 3/1958 | Birsh............................... | 273/157 R |
| 3,171,214 | 3/1965 | Sutherland................... | 273/157 R X |
| 3,402,934 | 9/1968 | Adams............................ | 273/156 |
| 3,558,136 | 1/1971 | McFarland................... | 273/157 R X |

FOREIGN PATENTS OR APPLICATIONS

| | | | |
|---|---|---|---|
| 641,430 | 4/1928 | France........................... | 273/157 R |
| 1,483,774 | 5/1967 | France........................... | 273/157 R |
| 490,302 | 8/1938 | United Kingdom............ | 273/157 R |
| 403,691 | 12/1933 | United Kingdom............ | 273/157 R |

OTHER PUBLICATIONS

Polyominoes by Solomon W. Golomb, Charles Scribner's Sons, New York, N.Y. 1965, pp. 25, 28, 29, 105 relied on.

"Polyominoes" by Solomon W. Golomb, publ. 1965, by Charles Scribner's Sons, New York, pp. 106–109, 151–167.

Primary Examiner—Anton D. Oeschsle
Attorney, Agent, or Firm—George H. Mortimer

[57] ABSTRACT

A board having four rectangles of 90 squares dimensioned respectively 9 × 10, 6 × 15, 5 × 18 and 3 × 30. At least one set of the 18 one-sided pentominoes are provided for disposition in the aforesaid rectangles. In one embodiment a number on one side of each pentominoe piece is related to the difficulty of playing the piece. In another embodiment, two sets of pentominoes are provided with opposite checkerboard patterns. In other embodiments, the pentominoes are provided with parts of a message, picture or geometric design.

1 Claim, 7 Drawing Figures

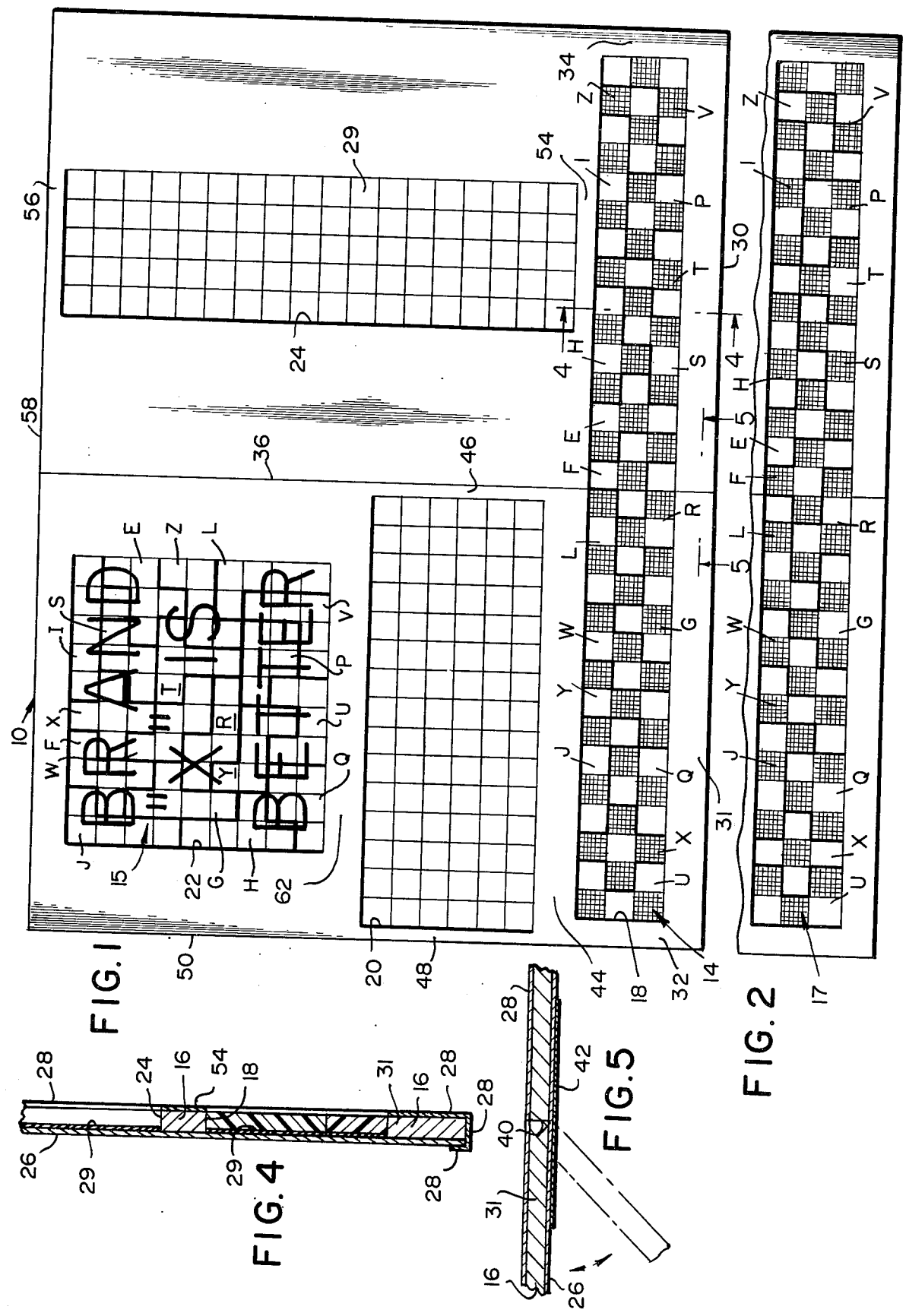

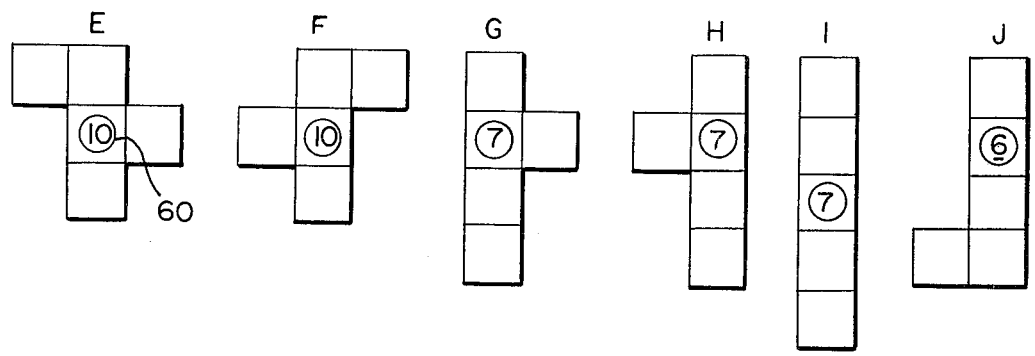
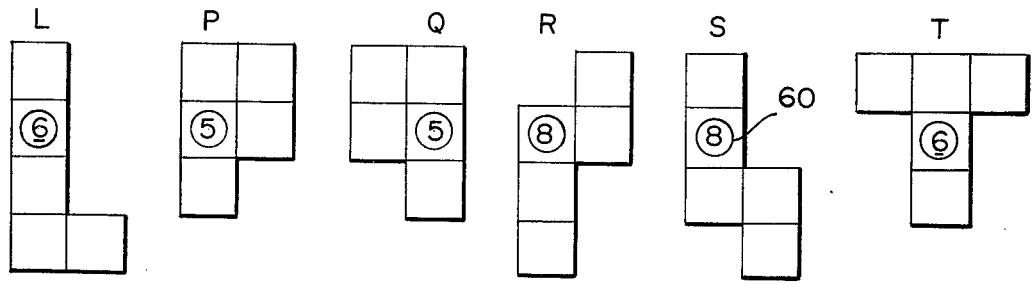
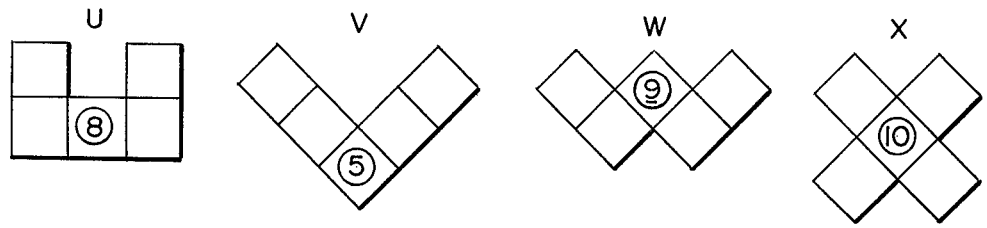
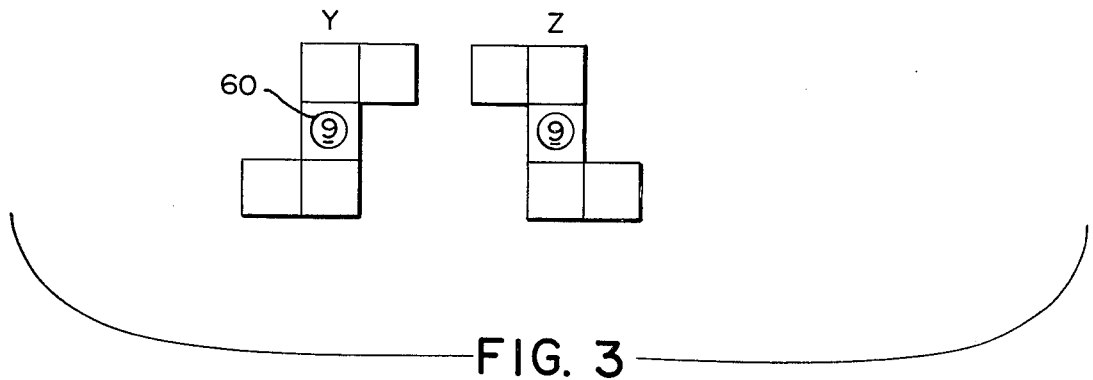
FIG. 3

PENTOMINO PUZZLES

BACKGROUND OF THE INVENTION

The invention relates to educational and amusement devices utilizing one or more boards having one or more rectangular playing fields or areas and one or more sets of 18 different one-sided pentominoes.

Pentominoes are a species of polyominoes which are shapes made by connecting equal-sized squares of various numbers so that each square has a full edge connection with at least one other square. The polyomino sequence begins with the lowest polyomino, the domino which has two squares and progresses to the tromino having three squares, the tetromino having four squares, the pentomino having five squares, the hexomino having six squares, the heptomino having seven squares, etc.

The branch of mathematics dealing with ways in which these geometric shapes may be arranged or combined is called combinatorial geometry. It is a very useful and complex field of mathematics which, however, does not lend itself yet to treatment by formulas and equations. For example, no equation is known for determining the number of the various ominoes. Moreover, since each piece is capable of rotation, i.e., angular motion around an axis perpendicular to the bottom surface of the piece on a supporting surface, and reflection, i.e., flipping the piece over so that its bottom surface becomes its top surface, the combining possibilities rapidly increase as the number of ominoes increases. Some polyominoes have reflective symmetry, i.e., the same configuration on reflection, while others do not. If polyominoes are excluded which have reflective symmetry, i.e., both broad surfaces of each polyomino are, or are considered, the same in appearance they are known as two-sided polyominoes and the number of two-sided ominoes for each numbers of squares from dominoes to heptominoes is as follows:

| NUMBER OF SQUARES | NUMBER OF TWO-SIDED OMINOES |
|---|---|
| dominoes (2) | 1 |
| trominoes (3) | 2 |
| tetrominoes (4) | 5 |
| pentominoes (5) | 12 |
| hexominoes (6) | 35 |
| heptominoes (7) | 108 |

If polyominoes that have relfective symmetry and their reflective symmetrical counterparts are included, i.e., the two broad surfaces of each polyomino are different in appearance they are known as one-sided polyominoes and the number thereof is larger than the number of two-sided polyominoes. With tetrominoes and pentominoes, for example, if reflection is eliminated, the number of ominoes increases from five two-sided, to seven one-sided tetrominoes and from 12 two-sided to 18 one-sided pentominoes.

The educational and amusement device of the present invention contemplates not only the various combinations of the boards and the pieces but also a novel board and novel sets of pentominoes.

Polyomino games and puzzles have been proposed in prior literature and patents. Reference in this connection is made to a book entitled "POLYOMINOES" by Solomon W. Golomb, Charles Scribner in New York, N. Y., 1965 and the bibliography therein, and to U.S. Pat. No. 2,900,190 granted to Jules Pestieau on Aug. 18, 1959. The prior art, however, does not disclose the present invention or make it obvious to one of ordinary skill in this art.

SUMMARY OF THE INVENTION

The present invention is an educational and amusement device having a number of aspects.

One aspect of the present invention is an educational and amusement device comprising in combination one or more boards with one or more rectangular playing fields and one or more sets of one-sided pentominoes. Included among the educational devices which may be constructed in accordance with the invention are diagnostic instruments, instructional instruments, research instruments, and study aids. Among amusement device constructed in accordance with the invention are puzzles and games.

A second aspect of the invention is the boards themselves. The boards have one or more rectangular recesses of 9 × 10, 6 × 15, 5 × 18, and/or 3 × 30 squares which constitute playing fields or areas. When all four of these rectangular recesses are available in a board, their preferred arrangement is such that the open board occupies an area of about 24 × 32 squares which can be folded to an area of about 24 × 16 squares.

A third aspect of the invention is one or more sets of 18 different one-sided pentominoes which are characterized by having on one broad side or on both sides of each piece singly or in combination: (1) value indicia, (2) alternate squares of different appearance such that any one set of such pieces is capable of being arranged in each of the rectangles having 9 × 10, 6 × 15, 5 × 18 and 3 × 30 squares with a perfect checkerboard pattern, and (3) part of a picture, geometric design, message and/or abstract art work so that when properly arranged in a rectangle of 90 squares a complete picture or the like is exhibited or presented. The invention also contemplates sets of pentominoes which have pictures or the like on both sides, the complete picture, or the like on each side may be the same or different, and the complete picture on each side may be formed when the 18 pieces are in the same or different arrangements on playing fields of the same or different rectangular dimensions.

BRIEF DESCRIPTION OF THE DRAWING

Referring now to the drawing:

FIG. 1 is a plan view in open position of the best embodiment of the folding board of the invention with one set of 18 different one-sided pentominoes having alternate squares of different colors arranged in the playing field having 3 × 30 squares in a perfect checkerboard pattern and a different set of 18 such pentominoes arranged in the rectangular recess having 9 × 10 squares to present a complete message;

FIG. 2 is a plan view of a set of 18 one-sided pentominoes arranged in the 3 × 30 playing area in same manner shown in FIG. 1 but with a different checkerboard pattern;

FIG. 3 is a composite view of the 18 different one-sided pentominoes having the preferred value indicia on the upper surface and arranged in accordance with the alphabetic names applied to the different pieces;

FIG. 4 is a fragmentary sectional view on the line 4—4 of FIG. 1;

FIG. 5 is a fragmentary sectional view on the line 5—5 of FIG. 1;

DESCRIPTION OF THE PREFERRED EMBODIMENTS

Figure 6:
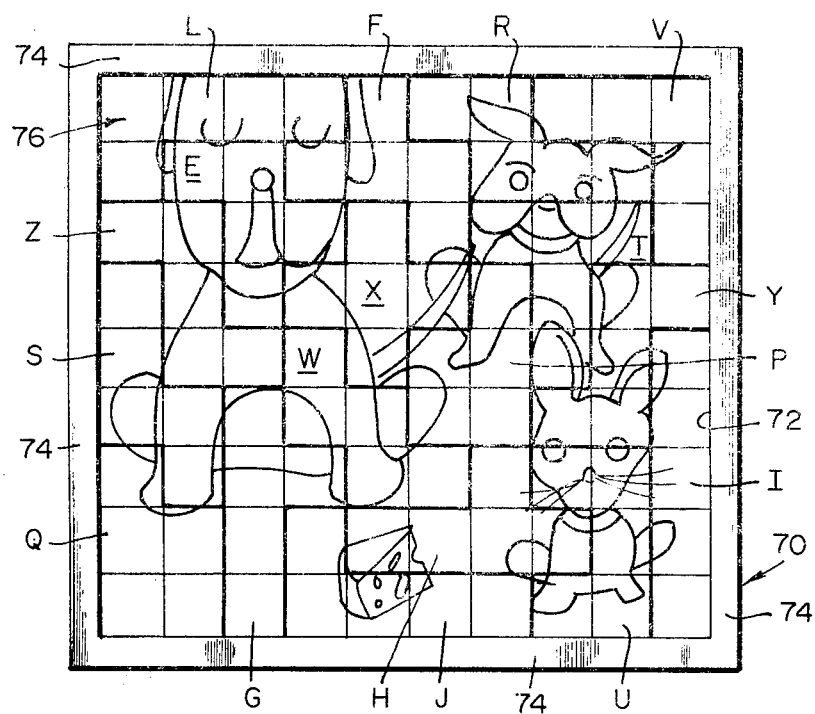
FIG. 6 is a plan view of the combination of a board having a recessed rectangular playing field of 9 × 10 squares with a set of 18 one-sided pentominoes arranged therein to present a complete picture.

Referring first to FIGS. 1 and 4 of the drawing, reference character 10 represents the best known embodiment of the board 12 of the educational and amusement device and it is shown in combination with two sets 14 and 15 of 18 different one-sided pentominoes. The upper surface of the board 12 has a plurality of playing fields in the form of rectangular recesses of 90 squares each. The sets of pentominoes can be arranged so as to occupy each square of each recess, and the sets 14 and 15 are so arranged in FIG. 1 in the 3 × 30 square and 9 × 10 square recesses, respectively.

The board may be made of any desirable material; for example, cardboard layer 16 having rectangular cut-outs 18, 20, 22 and 24 and a cardboard base 26 underlying and laminated to the cardboard layer 16. If desired the upper surface of the cardboard layer 16 may be covered by and laminated to a finish layer 28 of paper or the like which may be suitably decorated and carry printed intelligence such as the trademark, name of the manufacturer, instructions for use and play, etc. Similarly a layer 29 of paper or the like may be used to cover the surface at the bottom of each of the recesses 18, 20, 22 and 24 and it, where used, is secured by adhesive or otherwise to the base 26. It will be apparent that the board 12 may be made of other materials such as molded plastic, including foam plastic, sheet metal and the like, if desired. The cut-outs, after the base 26 is laminated to the board 16 form the recesses. These cut-outs and recesses have been designed in the drawing by the same reference numbers 18, 20, 22 and 24. These recesses constitute what may be called the playing surfaces, areas or fields in which the pentomino pieces are to be fitted, played and/or arranged for instruction, study and/or amusement.

Recess 18 is a rectangle of 3 × 30 squares, using the work square herein to mean approximately one-fifth the area of each pentomino. Recess 18 is preferably arranged adjacent and parallel to one edge 30 of the board 12 with a margin 31 between edge 30 and the adjacent edge of recess 18 and margins 32 and 34 at the left and right ends respectively of recess 18. The margin 31 may be approximately the same width as one of the squares. The margins 32 and 34 may be somewhat wider for a reason explained hereinafter.

Preferably the board 12 is foldable around a center line 36 perpendicular to the edge 30. Referring to FIG. 5 it will be seen that the board 12 may be made in two separate halves forming a butt joint 40 spanned by a tape 42 which forms a hinge for the two halves and permits them to be folded back to back by flexing the tape. The playing field in recess 18 spans this center joint. The other recesses 20, 22 and 24, however, are arranged economically and attractively in the two halves of the board 12 preferably with recesses 20 and 22 in one-half and recess 24 in the other half.

Recess 20, which provides the playing field of 6 × 15 squares, preferably is located adjacent and parallel to one half of the recess 18 of 3 × 15 squares in either half of the board 12, here shown in the left half, with an intermediate strip 44 between recesses 18 and 20. This intermediate or divider strip 44 may also be approximately the same width as a square. Similarly a strip 46 may be provided in the margin between recess 20 and the center line 36 of board 12 and a strip 48 provided between recess 20 and the adjacent edge 50 of the board 12. Because margin 46 is provided for recess 20 but not for recess 18, recess 20 extends about one square closer to the edge 50 than recess 18 which accounts for margin 32 being somewhat wider than margin 48.

Recess 22, which provides the playing field of 9 × 10 squares, may be arranged with the longer side parallel or perpendicular to the adjacent edge of recess 20. The longer side is shown parallel thereto with an intermediate strip 62 between recesses 20 and 22 which may also be about as wide as one or two squares.

Recess 24, which provides the playing field of 5 × 18 squares, may be centered in the other half of the board with its longer axis perpendicular to the edge 30 of the board 12. It is spaced from recess 18 by an intermediate strip 54 which may be about one square wide. A margin 56 is provided between recess 24 and the edge 58 of the board 12.

Assuming that margins 31, 32, 34 and 56 and the intermediate strip 54 have a width of one square, the dimensions of the board 12 are 24 × 32 squares. This is about the most compact and economical size for the board 12. The invention, of course, is not limited to this particular arrangement of the recesses 18, 20, 22 and 24 or to the stated dimensions of the margins and intermediate strips, although they are preferred. As to the size of the squares, this may vary from quite small, e.g., about one-eighth to one-fourth inch on a side which would be suitable for a traveling kit to fairly large, e.g., about ¾ to 1 inch or more for a demonstration kit. If the kit is to be used for demonstration before a group where the board would best be seen in upright position, the base 26 may be made of magnetizable material, for example, steel sheet, and the pentominoes may be made of, or have imbeded in them, pieces of permanent magnetic material.

The bottom surface 29 of each recess 18, 20, 22 and 24 preferably has horizontal and vertical lines creating squares on each playing surface 29. This enables the board 12 to be used for working puzzles, for playing games, and for diagnostic and educational purposes, as described in greater detail hereinafter.

Referring to FIG. 3, the individual pentominoes have 12 different configurations if reflections are permitted. If reflections are not permitted, there are 18 different one-sided pentominoes. For ease of reference and description, each of these 18 pentominoes is designated by a letter of the alphabet. The upper or visible surface of each of these pentominoes in FIG. 3 also bears a value indicium 60 which is related to the difficulty of playing the piece.

The letters of the alphabet designating these pieces are E, F, G, H, I, J, L, P, Q, R, S, T, U, V, W, X, Y and Z. The following have the same shape before and after reflection: I, T, U, V, W, and X. The following are reflections of each other: E and F, G and H, J and L, P and Q, R and S, and Y and Z.

The presence of the value indicia 60 is an important feature of one aspect of the invention. They make possible the scoring of each piece played. The particular value assigned to each piece is based upon the relative difficulty of playing that piece but since this involves a judgment the values are somewhat arbitrary. The simplest pieces to play in a puzzle or game for high scores are those designated by letters V, P and Q which have been given the value of 5. Next in order of difficulty of playing are the pieces designated by letters J, L and T which have been given the value of 6. Next in order of difficulty are the pieces designated by the letters G, H and I which have been given the value of 7. Next in order of difficulty are the pieces R, S and U which have been given the value of 8. Next in order of difficulty are the pieces designated W, Y and Z which have been given the value of 9. Finally those most difficult to play are the pieces designated E, F and X which have the value of 10. These value indicia 60 may be applied to the pentominoes in any suitable way, e.g., by molding the indicia 60 into them where they are made of molded plastic or other molded material, the indicia 60 may be adhered to the pentominoes as printed labels, they may be printed directly upon the surface of the pentominoes, or in any other suitable way.

The invention contemplates that the other side of the set of pentominoes shown in FIG. 3 may have a uniform appearance, show value indicia, a message, a picture, a geometric pattern, artwork, or the like. Any of these features or others on either one or both sides of the pentominoes serves to make the 18 pieces one-sided pentominoes, each of which is different in shape from the other 17 pieces.

The set 14 of pentominoes filling recess 18 in FIG. 1 shows a way of making one-sided pentominoes. This is done by providing one broad side of each piece with alternate squares of different appearance, e.g., black and white squares. This enables a checkerboard pattern to be produced when the parts are properly arranged in a rectangle. In the embodiment illustrated in recess 18 the dark squares have been designated with the customary marking for black and the light colored squares are left white. It will be understood, however, that any means of creating a different appearance can be used for producing the checkerboard markings on the individual pieces. The other broad surface may have any of the other suggested markings or be of uniform appearance.

The set 15 of pentominoes arranged in recess 22 in FIG. 1 shows a way of using a message to make one-sided pentominoes. This is done by providing one broad surface of each pentomino with part of the message which is complete when the pieces are arranged in only one relation to each other, as will be apparent from a consideration of FIG. 1. The other broad surface of the pieces of this set 15 may also have any of the other suggested markings or be of uniform appearance.

FIG. 2 shows another set 17 of 18 different one-sided pentominoes arranged in the same relation to each other as the set 14 shown in recess 18 of FIG. 1. The only difference between these two sets of FIGS. 1 and 2 is the location of the light and dark squares on each individual piece. To illustrate, the left-most piece in each figure is the U-pentomino. In FIG. 1 the upper left hand square is black whereas in FIG. 2 this square is white. A comparison of each pentomino in FIG. 1 with the corresponding one in FIG. 2 will show that the markings have been exchanged, i.e., what is black in FIG. 1 is white in FIG. 2, and vice versa.

Figure 7:
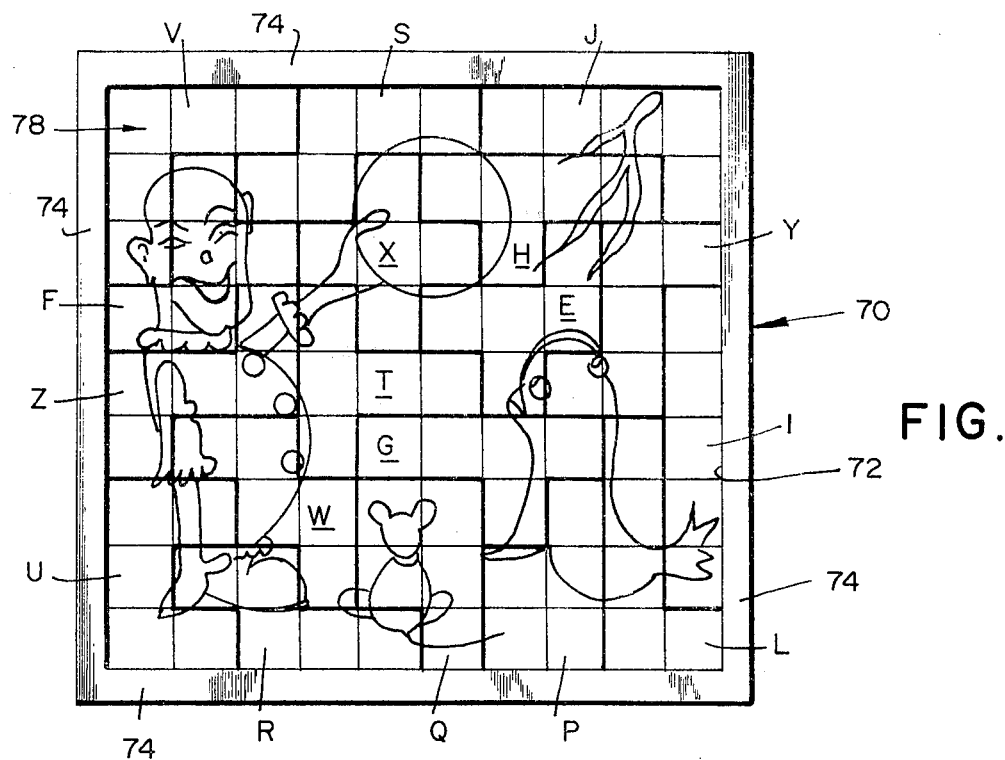
FIG. 7 is a plan view of the combination of a board like that of FIG. 6 with a set of 18 one-sided pentominoes arranged therein differently from the arrangement of FIG. 6 and presenting a different complete picture.

FIGS. 6 and 7 show how a picture may be used to make a set of one-sided pentominoes. In these figures a board 70 is used having a rectangular recess 72 of 9 × 10 squares with margins 74 at each side thereof. Each piece, or at least many of the pieces, have on one side a portion of a picture and when properly arranged present a complete picture.

The set 76 of pentominoes in FIG. 6 have one arrangement of the 18 pieces in a recess 72 of 9 × 10 squares. As shown, the picture is of the type which children like and this game is therefore appealing to children. It may be accompanied by a reproduction of the same picture as an aid to the child playing the game to fit the pieces together properly to reconstruct the complete picture, e.g., on the cover of a box for the game, on a separate card, or the like. The other side of the 18 pieces may have a uniform appearance or any other decoration, including the same picture or a different picture.

The set 78 of pentominoes in FIG. 7 have a different arrangement of the 18 pieces in a recess 72 of 9 × 10 squares. As with the set 76 shown in FIG. 6, the other side of the pieces of set 78 may have a uniform appearance or any other decoration including the same picture or a different picture.

If the same picture is used on both sides of the 18 pieces in set 76, the pictures could be applied in the same way on both sides so that the picture is complete on each side with the same arrangement of the pieces. On the other hand, the picture could be applied differently on one side from what it is on the other side so that a different arrangement of the 18 pieces is required to present the complete picture on the one side from the arrangement required to present the complete picture on the other side. Similarly if different pictures are applied to the two sides of a set of 18 pentominoes they may be applied so that both pictures are complete with a single arrangement of the pieces or the complete picture on one side may require a different arrangement from that required to form a complete picture on the other side. Set 76 and set 78 may, within the contemplation of the invention, be a single set of pieces or two sets of pieces.

The invention also contemplates sets of pentominoes which have on them designs, pictures and the like which require a particular arrangement of the pieces to form a complete design in playing fields other than the field of 9 × 10 squares shown in FIGS. 6 and 7, e.g., the fields of 6 × 15 squares, 5 × 18 squares and 3 × 30 squares.

The invention contemplates a number of sets of 18 different pentominoes which have either one side or both sides bearing such distinguishing characteristics as described, including a message, checkerboard, picture and the like. By "design" as used in the claims is meant any artwork, message, picture, geometrical pattern, checkerboard pattern, value indicia or the like. These various designs may be applied to the broad surface of the pentominoes in any suitable manner such as mentioned above for the method of applying the value indicia 60.

The number of possible arrangements of 18 pentominoes of a set such as shown in FIG. 3 varies for each recess 18, 20, 22 and 24. The recess allowing the fewest number of solutions is the recess 18 having the playing field of 30 × 30 squares. There are 46 known different arrangements of the 18 different one-sided pentominoes of such a set in a rectangular playing field of 3 × 30 squares. Not all of these arrangements can be made when the checkerboard pattern is used on the upper surfaces of the pieces of a set such as set 14 or set 17. All 46 known arrangements can be made by proper selection of the pieces from the two sets shown in FIG. 1 and FIG. 2, i.e., from the pieces of both sets 14 and 17. In marketing the present invention a manufacturer may find it desirable to provide two sets of the checkerboard-marked 18 one-sided pentominoes as shown in FIGS. 1 and 2 so as to increase the number of possible checkerboard solutions for each of the playing fields. Where this is done it may be desirable to have the one set distinguishable from the other, for example, by having one of the sets marked with a black and white checkerboard pattern while the other is marked in red and white, or the like.

The invention contemplates kits comprising one or more boards and one or more sets of pentominoes as follows:

A. One board containing various numbers of playing fields and various combinations of playing fields consisting of 9 × 10, 6 × 15, 5 × 18, and 3 × 30 squares and one set of 18 different one-sided pentominoes marked with various combinations of surface identification including, but not limited to, uniform appearance and designs, including value indicia, checkerboard pattern, artwork, message, picture, and geometric design.

B. One board containing various numbers of playing fields and various combinations of playing fields consisting of 9 × 10, 6 × 15, 5 × 18, and 3 × 30 squares and two or more sets of 18 different one-sided pentominoes marked with various combinations of surface identification including, but not limited to, uniform appearance and designs, including value indicia, checkerboard pattern, artwork, message, picture, and geometric design.

C. Two or more boards containing various numbers of playing fields and various combinations of playing fields consisting of 9 × 10, 6 × 15, 5 × 18, and 3 × 30 squares and two or more sets of 18 different one-sided pentominoes marked with various combinations of surface identification including, but not limited to, uniform appearance and designs, including value indicia, checkerboard pattern, artwork, message, picture, and geometric design.

As indicated hereinabove, the fundamentals of combinatorial geometry can be effectively taught by the use of pentominoes. One important use of the device of the present invention, therefore, is for instruction in and study of combinatorial geometry.

The device of the present invention also can be used for amusement either as a game involving two or more players or as a puzzle involving one or more persons. The device is unique for a number of reasons. Unlike a jigsaw puzzle that may have hundreds of pieces and only one solution, the present device, even with a single set of only 18 pieces of the type illustrated in FIG. 3 has over a million estimated solutions for the four 90 square playing fields. Such large numbers of solutions make the use of the device always dynamic, and despite this large number of solutions it is always challenging and never easy or boring even for intelligent adults. On the other hand, it can be made simple enough for a child to enjoy by designs such as illustrated in FIGS. 6 and 7. Many other puzzles are restricted, because of their nature, to solutions with one general outline and color arrangement whereas the present invention offers four differently shaped playing fields and a variety of sets of pieces. Other puzzles have a built-in and unchangeable degree of difficulty whereas the device of the present invention can be adjusted by the player so as to vary from moderately to extremely difficult. Since the pieces possess certain intrinsic qualties which affect their ease or lack of ease in being played, by playing the more difficult ones first, i.e. the higher valued ones, the easier ones remain to be played as the completion of the particular format being used is approached, thus the completing of the puzzle is only moderately difficult. If the easier pieces, i.e. the lower valued pieces, are played first, however, then the higher valued pieces remain to be played and the completion of the solution becomes extremely difficult.

The same situation obtains with game and puzzle variations that call for restricting the place on a playing field where one or more pieces may be played. By restricting the place or places where a high valued piece may be placed at the outset of the game or puzzle, the completion of the game or puzzle is only moderately difficult (this, however, is also affected by the position of the restricted piece in the format). By restricting a low valued piece, the completion of the game or puzzle becomes markedly more difficult.

The present invention can also be played by a wide variety of different numbers of players and offers nine basic puzzle and game variations. When used as a puzzle, a solution using the present invention might take an expert player as short a time as a minute. When played as a game, it can take as little as ten minutes time to play. Children from the ages of about 5 through 12 will find the children's version of FIGS. 6 and 7 stimulating fun. The adult version will be more appealing to persons from twelve years of age through adult.

The invention thus has great versatility due to its (A) few pieces and many solutions, (B) variable and controlable levels of difficulty, (C) four different playing fields, (D) adaptability to a variable number of players, (E) possessing nine basic game and puzzle variations which have numerous sub-variations, (F) playability as both a game and a puzzle, (G) variable playing time, and (H) adaptability to a wide range of ages.

When used as a puzzle the object of the amusement device of the invention is to fit all 18 one-sided pentominoes into the selected playing field of 9 × 10, 6 × 15, 5 × 18 or 3 × 30 squares. This may be done by one player alone or by two or more players cooperating with each other.

There are also a number of different ways in which the amusement device of the invention can be used as a game to be played by two or more players.

One game can be played by two players each of whom, at the start of the game, has nine pentominoes. Preferably these would be distributed by alternate choices of pieces by the two players, i.e., by each player alternately choosing one piece until each player has nine pieces. The pieces are then played alternately by the two players onto a selected playing field until no more pieces can be placed and taking as the score of each player the total of the value points of the pieces he places or by debiting his score with the value of the pieces he has not been able to play, or a combination of these two scoring methods.

In order further to illustrate the use of the invention, nine basic puzzle and game variations of the amusement device of the invention are briefly described in summary manner hereinafter. In this summary description the term "color code" is used generically to include the surface appearance of the selected side of the set of one-sided pentominoes being used, whether it is plain, i.e., the selected side of all pieces may be plain and uniform, or checkerboard, or capable of forming a picture, design, etc. The summary in each case gives the number of the variation, the number of players, the object of the puzzle or game, procedures, rules, strategy, scoring and comments for each variation:

VARIATION 1: Solitaire
NUMBER OF PLAYERS: One
OBJECT: To place all eighteen pieces into the playing field selected using one color code.
PROCEDURE: Select one of the playing fields and one of the color codes.
RULES: Pieces may be placed, moved and removed at will.
STRATEGY: Generally play the higher valued pieces first. Start from a corner or edge and work out from there. Do not play the P and Q pieces until near the completion of the puzzle.
SCORING: No points are scored in this puzzle variation.
COMMENT: The great flexibility of the puzzle will provide a player many hours of challenging entertainment.

VARIATION 2: One or more Piece Restriction.
NO. PLAYERS: One
OBJECT: Same as in Variation 1.
PROCEDURE: Select one of the playing fields and one of the color codes. Place one or more pieces into restricted positions within the playing field selected.
RULES: All pieces, except the ones restricted may be placed, moved and removed at will.
STRATEGY: Same as in Variation 1.
SCORING: Same as in Variation 1.
COMMENT: A player will discover that many restricted beginning positions are unsolvable while many others lead to really elegant solutions.

VARIATION 3: 5 Minute Limit
NO. PLAYERS: One
OBJECT: Same as in Variation 1.
PROCEDURE: Select one of the playing fields and one of the color codes. Note the starting and finishing times.
RULES: Same as in Variation 1. Also, pieces must be played so as to leave all unplayed areas of the playing field with a multiple of five squares, i.e. 5, 10, 15, etc. If, at the end of 5 minutes, there are one or more unplayed areas of the playing field that do not contain squares in multiples of five, one or more pieces must be removed to correct this condition. The remaining pieces will determine the player's score.
STRATEGY: Same as in Variation 1.
SCORING: The player's score may be recorded as the total positive value of the pieces played (see Rules above) or the total value of the pieces unplayed, whichever is desired. Since the total possible points is 135, positive points may be converted to negative points by adding the positive points to −135. Also, negative points may be converted to positive points by adding negative points to +135.
COMMENT: The best time so far recorded in completing the play in a playing field of 9 × 10 squares in 1 minute.

VARIATION 4: Nine Piece Draw
NO. PLAYERS: Two
OBJECT: To play the pieces each player has drawn, using the playing field and color code selected by the player who plays first, so as to maximize a player's score.
PROCEDURE: Each player will alternate in selecting one piece at a time until each has drawn nine pieces. The player who draws first will play last. The player who plays first will select the playing field and color code to be used. Both players will use the same playing field and color code.
RULES:
1. The first piece played must have at least one unit side of itself touching at least one edge of the playing field selected.
2. Every additional piece played must have at least one unit side of itself touching at least one unit side of any previously played piece.
3. When a played piece isolates one unplayed area of the playing field from another unplayed area, the resulting isolated areas must each contain a number of squares that is a multiple of five, i.e. 5, 10, 15, etc. A piece so played is safe and remains as played. A piece played that isolates any area that is not a multiple of five is an unsafe play and must be removed. The player who just played that piece may continue to try to make a safe play that same turn.
4. When one player is unable to make a safe play, it becomes the next player's turn.
5. When no player is able to make a safe play, the game is ended.
STRATEGY: Strategic play involves the consideration of the resources of each player, i.e., the shape and value of pieces that each player holds, and of the position of pieces already played on the board. Based upon this knowledge of resources and position, each player will play offensively and will isolate areas on the board that are good for his own pieces. Defensively each player will play his own pieces so as to counteract offensive plays by his opponent.
SCORING: One player will keep a running total of each player's score based upon the value of the pieces each player plays correctly and the point value of each player's unplayed pieces may be added to the score of his opponent. The player with the highest score at the end of the game is the winner.
COMMENT: The offensive and defensive strategies available in this variation make every game dynamic, challenging and exciting.

VARIATION 5: Nine-Piece Counterplay.
NO. PLAYERS: Two
OBJECT: For each player to play the pieces his opponent has drawn so as to minimize his opponent's score and maximize his own score.
PROCEDURE: Same as in Variation 4.
RULES: 1 through 5 as shown in Variation 4, including Rule 6 as follows:
6. If a player claims that he can make no safe play with any of his opponent's unplayed pieces, but the opponent can see where a safe play can be made, the opponent will make the play and score it as usual.
STRATEGY: Same as in Variation 4.
SCORING: Same as in Variation 4.

COMMENT: The lower valued pieces of the opponent will not always be the best ones to play.

VARIATION 6: 5 Minute Limit

NO. PLAYERS: Two

OBJECT: For each player to score as much as he can within the time limit using the playing field and color code selected by the player who plays first.

PROCEDURE: The first player will try to play all 18 pieces using the playing field and color code he has chosen while the second player notes his opponent's starting and finishing times. Next, the second player will try to play all 18 pieces using the same playing field and color code as the first player while the first player notes the starting and finishing times of the second player.

RULES: Same as in Variation 1.

STRATEGY: Same as in Variation 1.

SCORING: If both players complete the playing field, the player with the shortest time (in minutes and seconds) wins. If just one player completes the playing field, he is the winner. If neither player completes the playing field, the player with the highest number of points played or lowest number of points unplayed wins.

COMMENT: When the 5 minute time period is running out and a player can see that he cannot play all 18 pieces, he should make sure that the pieces he plays give him the highest possible score.

VARIATION 7: Six-Piece Draw.

NO. PLAYERS: Three

OBJECT: Same as in Variation 4.

PROCEDURE: Each player will alternate in selecting one piece at a time until each has drawn six pieces. The player who draws last will play first. The player who draws second will play second. The player who draws first will play last.

RULES: Same as in Variation 4.

STRATEGY: Same as in Variation 4.

SCORING: Same as in Variation 4.

COMMENT: The defensive strategies are even more important here than they are in the Nine-Piece Draw variation.

VARIATION 8: Six-Piece Counterplay

NO. PLAYERS: Three

OBJECT: For each player to play the pieces which the opponent on his right has drawn, so as to minimize the score of both his opponents and maximize his own score.

PROCEDURE: Same as in Variation 4.

RULES: Same as in Variation 4.

STRATEGY: Same as in Variation 4.

SCORING: Same as in Variation 4.

COMMENT: Same as in Variation 4.

VARIATION 9: 5 Minute Limit

NO. PLAYERS: Three or more

OBJECT: Same as in variation 6.

PROCEDURE: Same as in Variation 7, including the following:

The first player will try to play all 18 pieces using the playing field and color code he has chosen while another player notes his starting and finishing times The second and following players, when it is their turn, will also try to play all 18 pieces using the same playing field and color code.

RULES: Same as in Variation 1.

STRATEGY: Same as in Variation 1.

SCORING: If two or more players complete the playing field, the player with the shortest time (in minutes and seconds) wins. If just one player completes the playing field, he is the winner. If none of the players completes the field the player with the higher number of points played or the lowest number of points unplayed wins.

COMMENT: Same as in Variation 6.

In marketing the device of the invention it will ordinarily be desirable to provide a box or carrying case within which to enclose the board and the pieces. The particular form of box or carrying case is not a part of the invention so that no further illustration or description thereof is necessary.

Although the invention has been described and illustrated in connection with certain preferred embodiments those skilled in the art will recognize that many variation and modifications are possible within the principles of the invention outlined above.

I claim:

1. Two distinguishable sets of pentomino pieces, each set comprising 18 one-sided pentominoes, each pentomino in the set being different from all the other pentominoes in the set and having on one side alternate squares of different appearances capable of being arranged in a rectangle of 3 × 30 squares in a perfect checkerboard pattern, in which said pieces of each set are capable of being arranged in the same relation to each other in a rectangle of 3 × 30 squares in perfect but opposite checkerboard patterns.

* * * * *